Jan. 21, 1936.   N. E. WAGNER   2,028,425
METHOD AND APPARATUS FOR CUTTING METALS
Original Filed Sept. 4, 1925   3 Sheets-Sheet 1
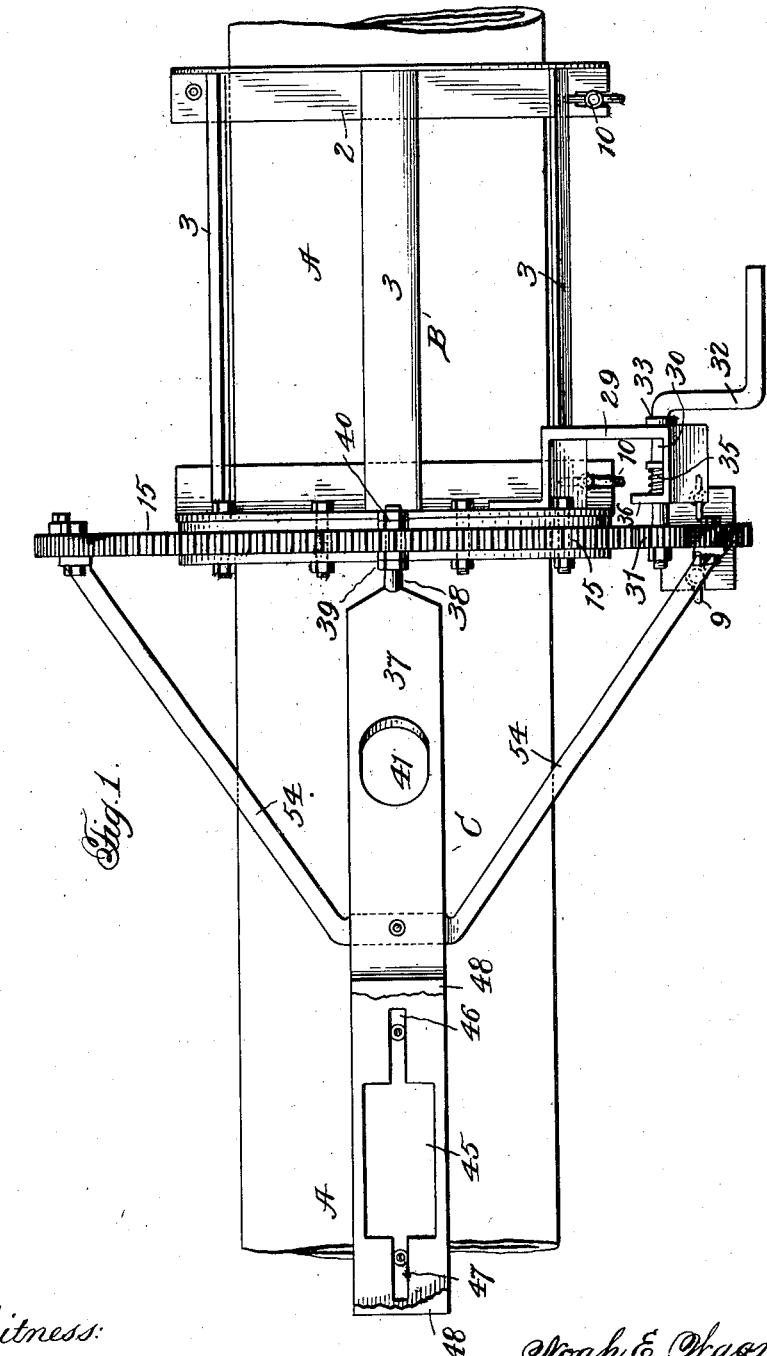

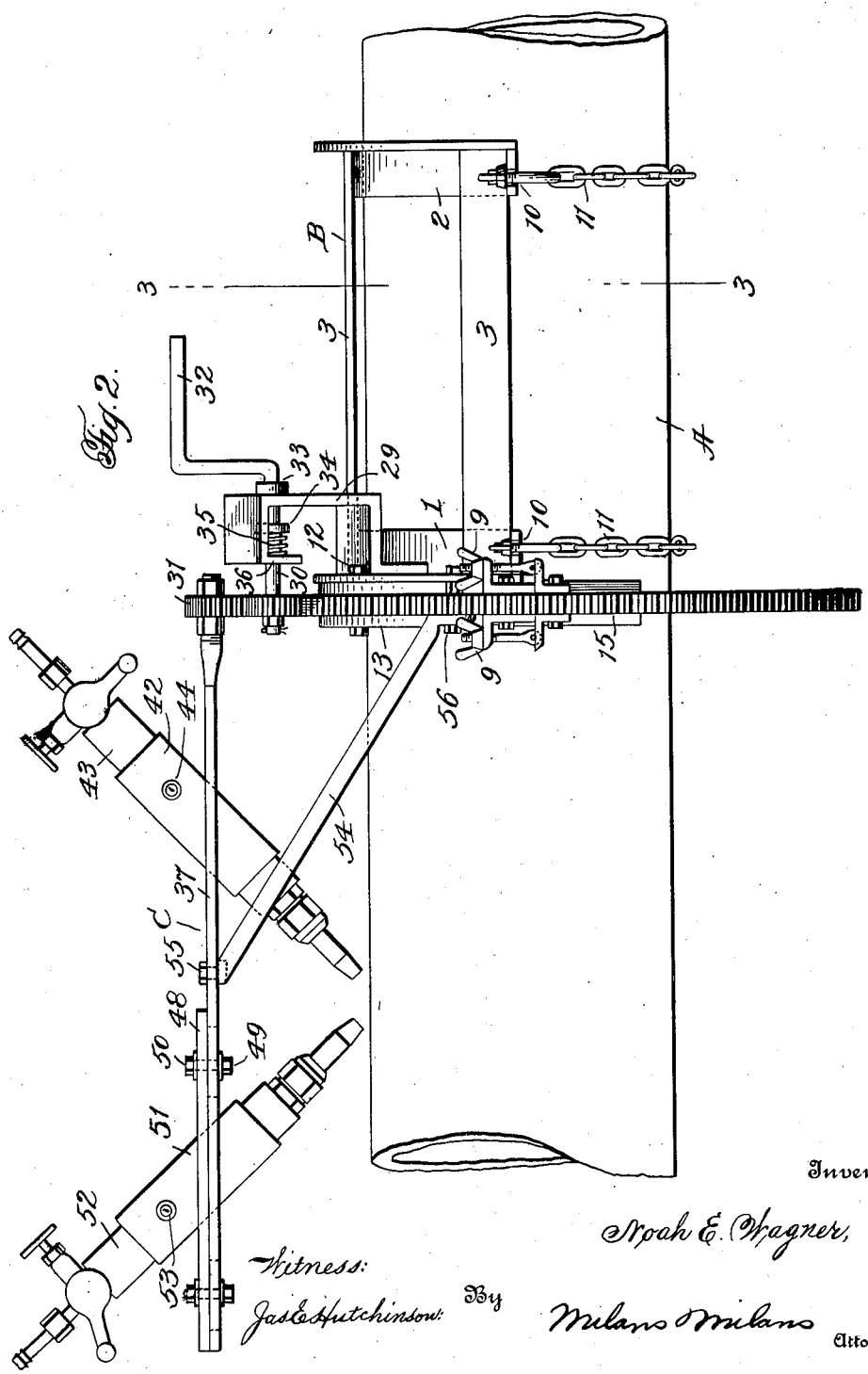

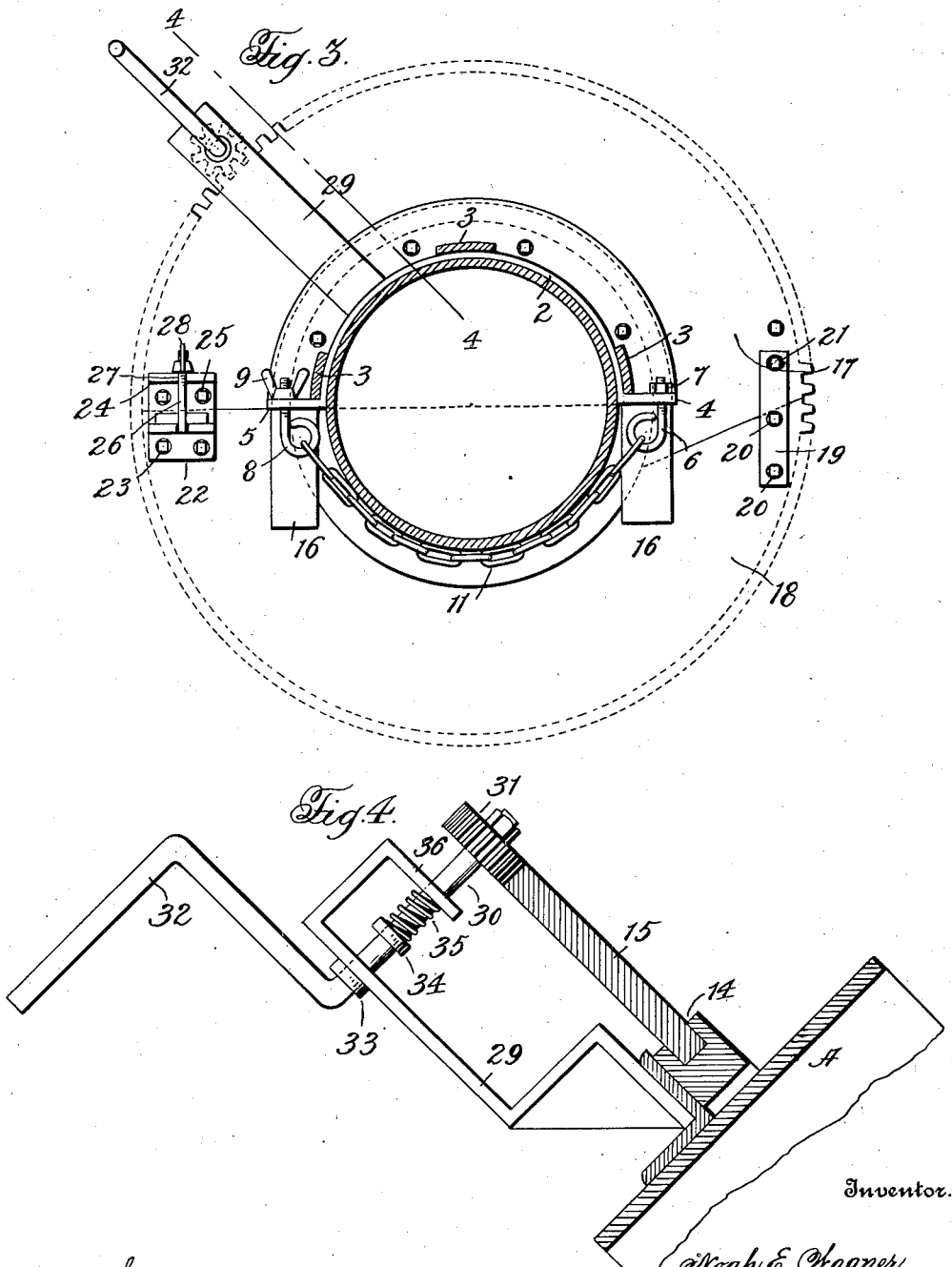

Patented Jan. 21, 1936

2,028,425

UNITED STATES PATENT OFFICE 2,028,425

METHOD AND APPARATUS FOR CUTTING METALS

Noah E. Wagner, Tulsa, Okla., assignor to The Linde Air Products Company, a corporation of Ohio Application September 4, 1925, Serial No. 54,549
Renewed May 23, 1934

23 Claims. (Cl. 266—23)

My invention relates to a method and apparatus for cutting metals and more particularly to a method and machine for cutting pipe which has already been welded or screwed together in a continuous line from one station or point to another or for cutting bevels on single lengths or joints of pipe in preparation for relaying by the oxy-acetylene or arc welding processes in a continuous line.

The principal object of the invention resides in the provision of a machine in which one or more oxy-acetylene cutting torches are used, said oxy-acetylene torch or torches being mounted for rotation around the pipe.

Another object of the invention resides in the provision of a novel form of frame or support adapted to be connected to the pipe and held against rotation thereon, and means carried by said frame or support for rotatably mounting the one or more oxy-acetylene cutting torches.

A further object of the invention resides in the provision of an improved machine for cutting pipe, in which the blowpipe means is adapted to direct jets of gaseous heating and oxidizing agents at an acute angle to the longitudinal axis of the pipe.

A further object of the invention consists in the provision of means whereby the oxy-acetylene cutting torches may be supported at an angle and whereby one of said torches may be adjusted relative to the other.

A further object of the invention resides in a novel method of cutting metal or the like by means of cutting jets in such a manner as to form receding or beveled ends at the points of the cut.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a top plan with parts removed.

Fig. 2 is a side elevation.

Fig. 3 is a transverse vertical section on the line 3—3 of Fig. 2, and

Fig. 4 is a section on the line 4—4 of Fig. 3.

In the drawings A represents a section of a pipe which it is desired to cut, B indicates generally the supporting frame of my improved machine and C indicates generally the support or carrying member for the oxy-acetylene cutting torches. The frame comprises the angle iron end pieces 1 and 2 which are connected together by means of the bars or strips 3 as more particularly illustrated in Figs. 1 and 2 of the drawings. The angle iron end pieces are preferably semi-circular in shape to conform to the curvature of the pipe and the ends of the pieces are bent at right angles as shown at 4 and 5, eye bolts 6 being connected to the portions 4 by means of the nuts 7 and eye bolts 8 being connected to the portions 5 by means of the thumb nuts 9, the ends of the portions 5 being slotted as shown more particularly at 10 in Figs. 1 and 2 of the drawings whereby the bolts 8 may be swung for disengagement. Chains 11 connect the eye bolts 6 and 8 and these chains are adapted to extend beneath the pipe A for securing the frame upon the pipe against rotation.

Secured to the angle iron member 1 by means of the bolts 12 is the inverted U-shaped yoke member 13 having the groove 14 formed in its outer face to rotatably support the relatively large gear wheel 15. The yoke has the downwardly extending portions 16 as more particularly illustrated in Fig. 3 of the drawings. These downwardly extending portions 16 extend to a point equal to the diameter of the inside circle of the gear and assist in carrying the gear wheel in perfect alignment. The gear wheel is formed in two sections the upper section being indicated at 17 and the lower section at 18 and the sections are connected together by means of the plates 19 which form hinges whereby the sections may be opened and closed. The plates are connected to the lower section 18 by means of the bolts 20 and to the upper section by means of the bolt 21. The sections are adapted to be detachably connected together at their opposite sides. An angle iron plate 22 is secured to each face of the lower section 18 by means of the bolts 23 and an angle iron plate 24 is secured to each face of the upper section 17 by means of the bolts 25. Threaded bolts 26 are connected to the angle iron plate 22 for swinging movement and these bolts are adapted to enter slots 27 formed in the angle iron plates 24 and are held in position for securing the sections of the gear in closed position by means of the wing nuts 28.

Secured to the angle iron plate 1 by welding or other suitable means is the bracket or support 29 adjacent the upper end of which is rotatably supported the shaft 30 which has secured to the inner end the small gear wheel 31 which is adapted to be meshed with the larger gear wheel 15. The outer end of the shaft 30 is formed into the crank handle 32 by means of which the shaft 30 may be rotated. Collars 33 and 34 are formed on the shaft 30 and a coiled spring 35 surrounds the shaft between the collar 34 and the portion 36 of the bracket or support 29. The coiled spring 35 normally holds the small gear wheel 31 out of mesh with the large gear wheel 15 and when it is desired to operate the machine the shaft 30 is forced inwardly against the action of the coiled spring until the small gear wheel 31 meshes with the larger gear wheel 15. When thus raised the shaft 30 may be rotated through means of the handle portion 32 and the small gear wheel 31 will be rotated and in turn rotate the larger gear wheel 15. The collar 33 formed on the shaft 30 will limit the inward movement of the shaft, said shaft being shown in its innermost position, with the gears in mesh in the drawings.

The oxy-acetylene cutting torch support comprises a plate or arm 37 which has the reduced threaded portion 38 formed on its inner end and adapted to extend through the large gear wheel 15. The plate is secured to the gear wheel by means of the nuts 39 and 40 engaging on opposite sides of the gear as shown more particularly in Figs. 1 and 2. The plate or arm 37 has the opening 41 formed adjacent its inner end through which extends and is secured a sleeve 42 which receives and supports the oxy-acetylene torch shown at 43. The torch is held in the sleeve 42 by means of the screw 44. Adjacent the outer end the plate 37 is provided with the elongated opening 45 from the ends of which extends a slot 46 and 47. A plate 48 is adapted to be supported upon the plate 37 and is adjustable upon the plate 37 by means of the bolts 49 and nuts 50, the bolts 49 passing through the slots 47 as quite clearly illustrated in the drawings. The plate 48 has the sleeve 51 extending therethrough and secured thereto said sleeve carrying the oxy-acetylene cutting torch 52, the torch being secured in the sleeve by means of the screw 53. As shown more particularly in Fig. 2 the sleeves are arranged at an angle so as to hold their respective cutting torches in intersecting planes at about a forty-five degree angle, the torches having their lower ends directed towards one another. It will be understood that the sleeve 51 carried by the plate 48 extends through the opening 45 formed in the plate 37.

The plate 37 is supported by means of the bracket 54 which has its upper end secured to the plate by means of the bolts and nuts 55 and its lower ends secured to the relatively large gear 15 by means of the bolts and nuts 56.

From the above detailed description it is thought that the construction of my machine will be clearly understood and I will now endeavor to more clearly describe the operation. When it is desired to cut a pipe by the oxy-acetylene torches the supporting frame B is connected to the top of the pipe by means of the chains 11 which are extended beneath the pipe and are secured to the supporting frame by means of the eye bolts 6 and 8. When the frame is thus supported the cutting torches are positioned with their lower ends at an angle, one directed towards the other, and slightly spaced above the surface of the pipe as more clearly indicated in Fig. 2 of the drawings. The large gear wheel 15 is rotatably supported by the yoke 13 and by pressing inwardly upon the crank handle 32 the small gear wheel 31 will be brought into mesh with the large gear wheel 15 and when rotated through means of the crank handle 32 the large gear wheel 15 will be rotated and carry with it the plate 37 which supports the torches 43 and 52. The cutting torches are thereby rotated around the pipe and will cut the same, the edges of the cut sections being beveled so that the pipe sections may be relaid when desired by the oxy-acetylene or arc welding processes. By having the gear wheel 15 formed in sections it can be appreciated that the gear may be removed from the yoke when desired and a gear of different diameter substituted therefor. At the same time, since the plate 37 is detachably connected to the large gear 15, the plate may be removed and another one connected in place thereof so that the cutting torches will be arranged at different angles to the pipe. It will be understood that suitable gases are supplied to the torches which are of well known construction and capable of delivering gaseous heating agents, such as jets of a combustible gas mixture of oxygen and acetylene; and also capable of delivering oxidizing agents, such as jets of oxygen.

In some instances it may be desirable to employ only a single torch to produce a bevelled cut in a pipe. In such cases one of the cutting torches 43 or 51 may be removed from its sleeve or the supply of gases thereto shut off. When the cutting torch 52 is employed by itself, it may be adjusted longitudinally of the axis of the pipe by means of the adjustable plate 48.

Having fully described my invention what I claim as new and desire to secure by Letters Patent is:

1. A machine for cutting pipe comprising a member rotatably mounted relative to the pipe, an arm connected to and rotatable with the member, cutting torches carried by the arm, one of the torches being adjustable relative to the other, and means for rotating the member and revolving the torches around the pipe.

2. A machine for cutting pipe comprising a member rotatably mounted relative to the pipe, an arm carried by the member, sleeves carried by the arm, cutting torches detachably mounted in the sleeves, and means for rotating the member and revolving the torches around the pipe.

3. A machine for cutting pipe comprising a member rotatably mounted relative to the pipe, an arm connected to and rotatable with the member, sleeves carried by the arm, one of said sleeves being adjustable relative to the other, cutting torches carried by the sleeves, and means for rotating the member and revolving the torches around the pipe.

4. A machine for cutting pipe comprising a member rotatably mounted relative to the pipe, an arm connected to and rotatable with the member, a cutting torch carried by the arm, a plate adjustably mounted on the arm, a cutting torch carried by the plate, and means for rotating the member for revolving the torches around the pipe.

5. A machine for cutting pipe comprising a member rotatably mounted relative to the pipe, an arm connected to and rotatable with the member, cutting torches carried by the arm, one of said torches being longitudinally adjustable on the arm, and means for rotating the member and revolving the torches around the pipe.

6. A machine for cutting pipe comprising a member rotatably mounted relative to the pipe, an arm connected to and rotatable with the member, said arm having an elongated opening therein, a torch carried by the arm, a plate adjustably mounted on the arm, a torch carried by the plate and extending through the elongated opening of the arm, and means for rotating the rotatable member and revolving the torches around the pipe.

7. The method of cutting metal work that comprises effecting relative movement of the work and intersecting cutting jets of gaseous heating and oxidizing agents, and maintaining such intersection below the surface of the work, whereby beveled surfaces are produced on the opposing portions of the work at the cut.

8. The method of cutting pipe or the like that comprises effecting relative rotation of such pipe or the like and independent intersecting cutting jets of gaseous heating and oxidizing agents, and maintaining such intersection along a line that is at least part way through the body being cut, whereby beveled surfaces are produced on the opposing portions at the cut.

9. In apparatus for cutting metal pipe and the like, the combination of torch supporting means, mechanism for effecting relative rotation of said supporting means and such pipe or the like, and torch means mounted on said supporting means adapted and arranged to deliver against said pipe independent intersecting cutting jets of gaseous heating and oxidizing agents, the plane of such jets being transverse to the direction of such rotation, whereby beveled surfaces are produced on the opposing portions of the pipe at the cut.

10. The method of cutting that comprises directing opposed intersecting cutting jets of gaseous heating and oxidizing agents against the same side of the work to be cut while such intersecting cutting jets and the work are moved relative to one another.

11. In metal cutting apparatus, the combination of torch supporting means, mechanism for effecting relative movement of said supporting means and the work, and cutting torches mounted on said supporting means in a plane transverse to the direction of such movement, such torches being both so mounted on said support as to direct jets against the same side and substantially same point of the work being cut and being bodily and angularly adjustable relative to one another to cooperatively relate them to conjointly cut at said point.

12. A machine of the character described for cutting pipe including a support, a rotatable member carried by the support and adapted to surround the pipe, an arm carried by the rotatable member and extending parallel with the longitudinal axis of the pipe, and longitudinally spaced aligned cutting torches carried by the arm and positioned to direct intersecting jets of gaseous heating and oxidizing agents against the pipe.

13. A machine of the character described for cutting pipe including a support, a rotatable member carried by the support and adapted to surround the pipe, an arm carried by the rotatable member and extending parallel with the longitudinal axis of the pipe, and longitudinally spaced aligned cutting torches carried by the arm and positioned to direct intersecting jets of gaseous heating and oxidizing agents against the pipe, one of said torches being adjustable relative to the other while maintaining its alignment therewith.

14. In a machine of the class described for cutting pipe, the combination of means adapted to be rotatably mounted relative to a pipe, torch supporting means connected to and rotatable with said rotatable means and including a member having an aperture and extending substantially parallel to the pipe, a plate attached to said member and adjustable thereon in a direction parallel to the pipe, said plate having an aperture in alignment with the aperture in said member, and means including a cutting torch extending through said apertures and secured to said plate and operative to direct jets of gaseous heating and oxidizing agents on the pipe.

15. A machine according to claim 14, in which said means extending through said apertures comprises a sleeve attached to said plate, said torch being mounted in said sleeve and adjustable thereon transversely to the longitudinal axis of the pipe.

16. A machine according to claim 14, in which said torch includes a nozzle arranged at an acute angle to the longitudinal axis of the pipe.

17. A machine for cutting pipe comprising a member rotatably mounted relative to the pipe, cutting torches carried by and rotatable with said member and arranged at an acute angle to the longitudinal axis of the pipe, one of said torches being adjustable longitudinally of the pipe relative to the other, and means for rotating said member and revolving said cutting torches about said pipe.

18. A machine for cutting pipe comprising a member rotatably mounted relative to the pipe, an arm connected to and rotatable with said member, cutting torches carried by said arm and arranged at an acute angle to the longitudinal axis of the pipe, one of said torches being adjustable lengthwise of said arm relative to the other, means for rotating said member and revolving said torches about said pipe.

19. A machine for cutting pipe comprising a support to be received on the pipe, flexible members connected to the support and engageable with the pipe for connecting the support thereto, a member rotatably mounted on said support, cutting torches carried by said rotatable member and arranged at an acute angle to the longitudinal axis of the pipe, and means for rotating said member and revolving said torches about said pipe.

20. A machine for cutting pipe comprising an inverted U-shaped yoke adapted to be supported on the pipe, a member rotatably mounted on said yoke, cutting torches carried by said rotatable member and arranged at an acute angle to the longitudinal axis of the pipe, and means for rotating said member and revolving said torches about said pipe.

21. A machine for cutting pipe comprising structure including torch supporting means, cutting torches carried by said supporting means, means for mounting said structure on the pipe with said torches disposed at an acute angle to the longitudinal axis of the pipe, one of said torches being adjustable longitudinally of the pipe with respect to the other, such structure being rotatable about the peripheral surface of the pipe, and mechanism on said structure for effecting relative movement between such torches and the pipe.

22. In apparatus for cutting metal pipe, the combination of torch supporting means; means for effecting relative movement of said torch supporting means and such pipe; and a pair of cutting torches carried by said supporting means, said torches being positioned in spaced relation and adapted to apply gaseous heating and oxidizing jets simultaneously to the peripheral surface of the pipe to cut out a section thereof, at least one of said cutting torches being adjustable longitudinally of the pipe on said supporting means.

23. The method of cutting metal work to provide a beveled edge, such method comprising disposing two separate cutting jets of gaseous heating and oxidizing agents in intersecting planes; applying said jets to the same side of the work to be cut; and moving said jets and said work relatively to one another.

NOAH E. WAGNER.